United States Patent
Spulak et al.

(10) Patent No.: US 10,958,745 B2
(45) Date of Patent: Mar. 23, 2021

(54) SYSTEM AND METHOD FOR THE CREATION, MANAGEMENT, AND DELIVERY OF PERSONAL COOKIE-LIKE PACKETS OF INFORMATION TO BE UTILIZED AS REVERSE COOKIES WITHIN NETWORK-BASED ENVIRONMENTS

(71) Applicants: Linda M. Spulak, Indian Creek, IL (US); Michael Teather, Round Lake, IL (US); Joanne Popper, Park Ridge, IL (US)

(72) Inventors: Linda M. Spulak, Indian Creek, IL (US); Michael Teather, Round Lake, IL (US); Joanne Popper, Park Ridge, IL (US)

( * ) Notice: Subject to any disclaimer, the term of this patent is extended or adjusted under 35 U.S.C. 154(b) by 0 days.

(21) Appl. No.: 16/522,212

(22) Filed: Jul. 25, 2019

(65) Prior Publication Data

US 2020/0084285 A1    Mar. 12, 2020

Related U.S. Application Data

(60) Provisional application No. 62/727,874, filed on Sep. 6, 2018.

(51) Int. Cl.
*H04L 29/08* (2006.01)
*H04L 29/06* (2006.01)
*H04L 12/46* (2006.01)

(52) U.S. Cl.
CPC ......... *H04L 67/22* (2013.01); *H04L 12/4641* (2013.01); *H04L 29/08675* (2013.01);
(Continued)

(58) Field of Classification Search
CPC ......... H04L 29/08621; H04L 29/08675; H04L 29/08918–08936; H04L 63/0281;
(Continued)

(56) References Cited

U.S. PATENT DOCUMENTS 7,398,393 B2    7/2008 Mont et al.
8,166,406 B1 *  4/2012 Goldfeder ............. H04L 63/102
                                                        715/745
(Continued)

OTHER PUBLICATIONS

International Search Report PCT/US19/49323—dated Dec. 29, 2019.
Written Opinion PCt/US19.49323—dated Dec. 29, 2019.

*Primary Examiner* — Brendan Y Higa
(74) *Attorney, Agent, or Firm* — Clifford H. Kraft

(57) ABSTRACT

A method and system of daily or other periodic creation of a user-sponsored cookie-like packet of encoded and encrypted information containing personal identity details and information use rules which, when the packet is attached to a delivery mechanism such as a browser header record, it is delivered to network-based resource provider platforms. Upon receipt and recognition of the modified header record by a subscribing provider, the cookie-like information packet is decrypted and decoded by application programs revealing personal identity details as well as associated data rules. Data capture rules define how participating resource providers can utilize, share, or sell provided data including rules related to whether captured or acquired data can supplement provided data. Supplemental data may include, but is not limited to, additional personal identity details, online habits, preferences, and other personal information or behaviors which may be analyzed or utilized for commercial and/or non-commercial purposes.

24 Claims, 8 Drawing Sheets

(52) U.S. Cl.
CPC .... *H04L 29/08936* (2013.01); *H04L 63/0281* (2013.01); *H04L 63/0428* (2013.01); *H04L 63/08* (2013.01); *H04L 67/02* (2013.01); *H04L 67/146* (2013.01); *H04L 67/306* (2013.01); *H04L 69/22* (2013.01)

(58) Field of Classification Search
CPC ....... H04L 63/0428; H04L 63/08–0846; H04L 63/10–105; H04L 67/02; H04L 67/146; H04L 67/22; H04L 67/30–306; H04L 69/22
See application file for complete search history.

(56) References Cited

U.S. PATENT DOCUMENTS

| | | | | |
|---|---|---|---|---|
| 8,943,602 | B2* | 1/2015 | Roy | G06F 21/6263 726/26 |
| 9,059,966 | B2 | 6/2015 | Agarwal et al. | |
| 9,219,787 | B1* | 12/2015 | Manion | H04L 67/02 |
| 2002/0083013 | A1* | 6/2002 | Rollins | H04L 63/0464 705/76 |
| 2006/0075122 | A1* | 4/2006 | Lindskog | H04L 63/168 709/228 |
| 2008/0104199 | A1* | 5/2008 | Kalaboukis | G06Q 30/02 709/217 |
| 2009/0064302 | A1* | 3/2009 | Colella | G06Q 20/3674 726/9 |
| 2009/0106349 | A1* | 4/2009 | Harris | H04L 67/02 709/203 |
| 2011/0296036 | A1* | 12/2011 | Canning | H04L 63/0815 709/228 |
| 2012/0042006 | A1* | 2/2012 | Kiley | H04L 67/18 709/203 |
| 2012/0096068 | A1* | 4/2012 | Canning | H04L 67/02 709/203 |
| 2012/0174236 | A1* | 7/2012 | Goodwin | H04L 63/102 726/27 |
| 2012/0190386 | A1* | 7/2012 | Anderson | G01S 19/14 455/456.3 |
| 2013/0017806 | A1* | 1/2013 | Sprigg | H04M 1/66 455/411 |
| 2013/0332618 | A1* | 12/2013 | Kasivajjula | H04L 67/142 709/228 |
| 2014/0189820 | A1* | 7/2014 | Pieczul | H04L 63/08 726/5 |

* cited by examiner

Appended for Redirection of Request to Proxy

:authority: www.facebook.com
:method: GET
:path: /
:scheme: https
accept: text/html,application/xhtml+xml,application/xml;q=0.9,image/webp,image/apng,*/*;q=0.8
accept-encoding: gzip, deflate, br
accept-language: en-US,en;q=0.9
cache-control: max-age=0
cookie: datr=MLDDVrTZFWp2-b_u7j-pnTws; sb=OeoJV6vxx9StPSGK86RAwo7t; c_user=100004169469999; xs=45%3A-V3cQcis5z09tQ%3A2%3A1519926617%3A18140%3A2874; dpr=2; fr=0ASq9HB80uJ0xSnvF.AWVyZOM9q-3VcfuWNf0do3U6V94.BWw7A-.4I.FsN.0.0.BbEBN1.AWUNeyd1;presence=EDvF3EtimeF1527781448EuserFA21B04169460167A2EstateFDutF1527781448028CEchFDp_5f1B04169460167F2CC; wd=880x989
dnt: 1
upgrade-insecure-requests: 1
user-agent: Mozilla/5.0 (Windows NT 10.0; Win64; x64) AppleWebKit/537.36 (KHTML, like Gecko) Chrome/66.0.3359.181 Safari/537.36
Proxy-Authorization: Basic YWxhZGRpbjpvcGVuc2VzYW1l

FIG. 2b

Appended for Redirection of Request to Proxy

:authority: www.facebook.com
:method: GET
:path: /
:scheme: https
accept: text/html,application/xhtml+xml,application/xml;q=0.9,image/webp,image/apng,*/*;q=0.8
accept-encoding: gzip, deflate, br
accept-language: en-US,en;q=0.9
cache-control: max-age=0
cookie: datr=MLDDVrTZFWp2-b_u7j-pnTws; sb=OeoJV6vxx9StPSGK86RAwo7t; c_user=100004169469999; xs=45%3A-V3cQcis5z09tQ%3A2%3A1519926617%3A18140%3A2874; dpr=2; fr=0ASq9HB80uJ0xSnvF.AWVyZOM9q-3VcfuWNf0do3U6V94.BWw7A-.4I.FsN.0.0.BbEBN1.AWUNeyd1;presence=EDvF3EtimeF1527781448EuserFA21B04169460167A2EstateFDutF1527781448028CEchFDp_5f1B04169460167F2CC; wd=880x989
dnt: 1
upgrade-insecure-requests: 1
user-agent: Mozilla/5.0 (Windows NT 10.0; Win64; x64) AppleWebKit/537.36 (KHTML, like Gecko) Chrome/66.0.3359.181 Safari/537.36
Proxy-Authorization: Basic YWxhZGRpbjpvcGVuc2VzYW1l

FIG. 2c

Modified Header Record – ID/Rule Packet Encoded & Encrypted

:authority: www.facebook.com
:method: GET
:path: /
:scheme: https
accept: text/html,application/xhtml+xml,application/xml;q=0.9,image/webp,image/apng,*/*;q=0.8
accept-encoding: gzip, deflate, br
accept-language: en-US,en;q=0.9
cache-control: max-age=0
cookie: datr=MLDDVrTZFWp2-b_u7j-pnTws; sb=OeoJV6vxx9StPSGK86RAwo7t; c_user=100004169469999; xs=45%3A-V3cQcis5z09tQ%3A2%3A1519926617%3A18140%3A2874; dpr=2; fr=0ASq9HB80uJ0xSnvF.AWVyZOM9q-3VcfuWNf0do3U6V94.BWw7A-.4I.FsN.0.0.BbEBN1.AWUNeyd1; presence=EDvF3EtimeF1527781448EuserFA21B04169460167A2EstateFDutF1527781448028CEchFDp_5f1B04169460167F2CC; wd=880x989
dnt: 1
upgrade-insecure-requests: 1
user-agent: Mozilla/5.0 (Windows NT 10.0; Win64; x64) AppleWebKit/537.36 (KHTML, like Gecko) Chrome/66.0.3359.181 Safari/537.36
Proxy-Authorization: Basic YWxhZGRpbjpvcGVuc2VzYW1l
x-wwpcm-data: ax7PDkHMDr2WThR+1/+JC/7hFUtFhh91TPkNpH2WCZc=      ~ 203

FIG. 6
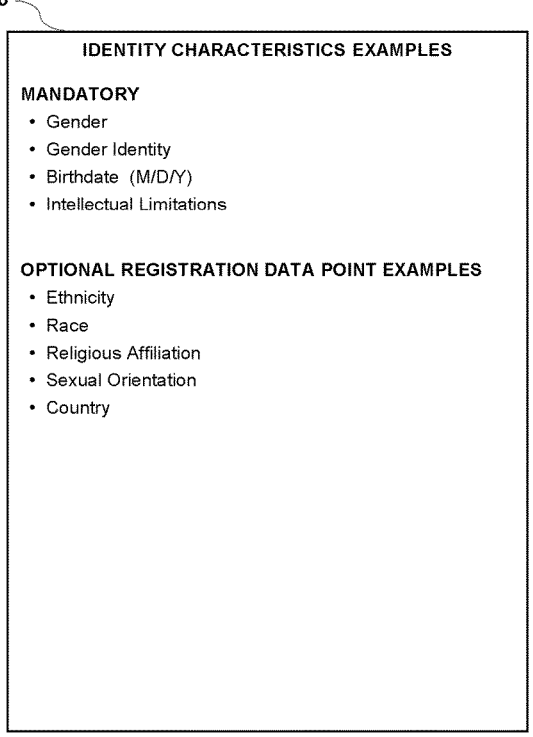
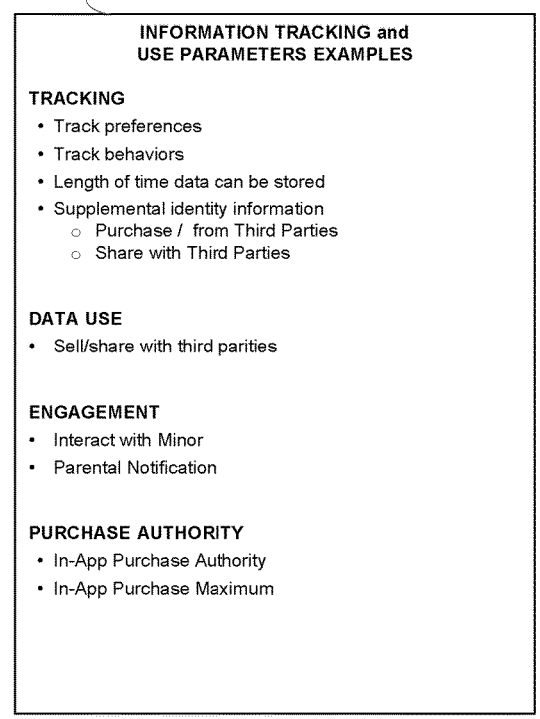

SYSTEM AND METHOD FOR THE CREATION, MANAGEMENT, AND DELIVERY OF PERSONAL COOKIE-LIKE PACKETS OF INFORMATION TO BE UTILIZED AS REVERSE COOKIES WITHIN NETWORK-BASED ENVIRONMENTS

BACKGROUND

Field of the Invention

The present invention relates generally to computer networks, and more specifically to a system and method for resource consumers and resource providers connecting via a networked environment to achieve control and security of personal identity characteristics.

Description of the Problem Solved

The Internet, a global computer network of networks, provides accessibility to a variety of information and communication facilities via the world wide web using standards and communication protocols. These standards and protocols developed and maintained by a collection of non-profit organizations and governing agencies facilitate the efficient transfer of information between website owner/operators and visitors to their website. Working within these standards, owner/operators of websites or other network-based platforms including third-party advertisers utilize various cookie formats or other mechanisms to identify, track, and store the identity characteristics, preferences, and behaviors of platform visitors. Unfortunately, these standards and protocols do not allow platform visitors, (resource consumers), to have reciprocal leverage in establishing the boundaries of their relationship with the owner/operators of platforms, (resource providers).

Application (App) stores provide visibility to and delivery of resources built for specific mobile network-enabled smart devices and their associated operating systems. In many, but not all, instances mobile app stores provide a method to block or limit access to content judged as inappropriate based on the device user's age. Unfortunately, this method is based on the honor system which allows visitors to misrepresent their date of birth, or other personal identity characteristics, in order to access inappropriate resources from network-based or online resource providers.

What is needed is a method and system that provides a collaborative platform where resource consumers have the ability to proactively and systematically deliver verifiable personal identity characteristics, their list of rules relating to data collection, and their list of data usage rules in exchange for access to or delivery of relevant and appropriate resources from network or online resource providers.

SUMMARY OF THE INVENTION

The present invention addresses the above needs by providing subscribing users or the parents/guardians of dependents, the ability to take a proactive role in defining the type, extent, and use of verifiable personal identity information, preferences, and behaviors for their dependents, addressing issues including reciprocity. This is achieved by providing subscribing users with a platform to systematically create, control, and deliver cookie-like information packets containing their personal identity characteristic or details and corresponding rules, to subscribing resource providers, and rules definition functionality providing a method to: (a) establish boundaries related to supplemental personal data collection, (b) define parameters relating to how provided or collected data can be used, (c) provide contact and/or interaction permission pathways, and (d), prescribe information-sharing limitations with third-parties.

In return, subscribing resource providers: (a) receive personally identifiable and verifiable information, permissions, and data-related rules needed to deliver appropriate responses and work within defined boundaries, especially when interacting with minors, protected individuals, or adult dependents; (b) have the opportunity to easily comply with existing or future privacy or related laws or legislation; (c) utilize a dynamic platform to expand the breadth and depth of online relationships with subscribing or registered users through partnerships with other subscribing resource providers of complementary products and services; and, (d) can, through creative use of a platform, build brand equity and achieve business-related goals. Most important, the present invention facilitates the development and nurturing of reciprocal, collaborative, and relevant relationships that are established in a network or online environment, with the potential to extend the relationship to other platforms including those established via phone or in-person contact. What makes the concept of a reverse cookie possible is the novel use of a browser header record as its method of delivery to target resource platforms. The system generates and stores a user ID for each registered user and an associated rule set for the user ID detailing how the user ID information may be used including distribution to third parties. The user may update the ID and rule set at any time. The system generates and encrypts a cookie-like information packet from each stored user ID and rule set typically at a fixed time every day with midnight being the preferred fixed time. This cookie-like information packet is available for use by the user during the twenty-four-hour period.

The present invention establishes a formal bilateral communication platform to support and sustain collaborative relationships conducted via the resource consumer's use of registered network-enabled devices and a participating resource provider's network-based system, such as the Internet.

According to the present invention, a system and method is provided for the daily, or otherwise periodic, generation and real-time release of an information packet that resembles a cookie known in the art. The packet can contain: (a) encoded and encrypted personal identity characteristics and, (b), encoded and encrypted rules matrix defining how provided, collected, or acquired identifying characteristics, preferences, and online behaviors can be utilized by resource providers for commercial and non-commercial purposes. These special packets will be called cookie-like information packets.

According to a particular embodiment, a method for evaluating data usage and relationship rules by application software in order to: (a) determine the appropriate visual interface to be presented to the subscribing or registered user; (b) if or how a subscribing or registered user's online behaviors or preferences can be monitored, stored or aggregated; or, (c) to what extent the subscribing or registered user's information can be shared with internal or external third-parties.

The method additionally comprises the encoding, encryption, and release of the consumer-generated self-updating cookie-like information packet appended to a browser header record, said information packet is either recognized, decrypted, decoded and utilized by participating resource providers, or simply ignored as a benign data packet when received by non-participating resource providers.

The cookie-like information packet typically provides resource providers with the individual's current age, gender, gender identity and intellectual limitations in order support the resource providers efforts to deliver a relevant user interface and online experience as a method to enhance and prolong its commercial or non-commercial relationship with the subscribing or registered user.

The present invention will be better understood upon reference to the following detailed description and associated drawings.

BRIEF DESCRIPTION OF DRAWINGS

The method and process of the present invention provides a platform wherein registered resource consumers and providers of products, resources, services, tools, information, accessible via a network environment, can establish a collaborative rules-based relationship based on parameters defined by subscribers in order to facilitate achievement of common goals. The features, objects, and advantages of the present invention will be better understood by referring to the Detailed Description section in conjunction with the accompanying drawings.

FIG. 2a, FIG. 2b, and FIG. 2c are a series of block diagrams illustrating the evolution of a browser-generated header record to a modified browser header record described by this method.

FIG. 6 is a table illustrating by example, the types of identity and rules information which may be included within the subscribing or registered user's cookie-like information packet.

Figure 1:
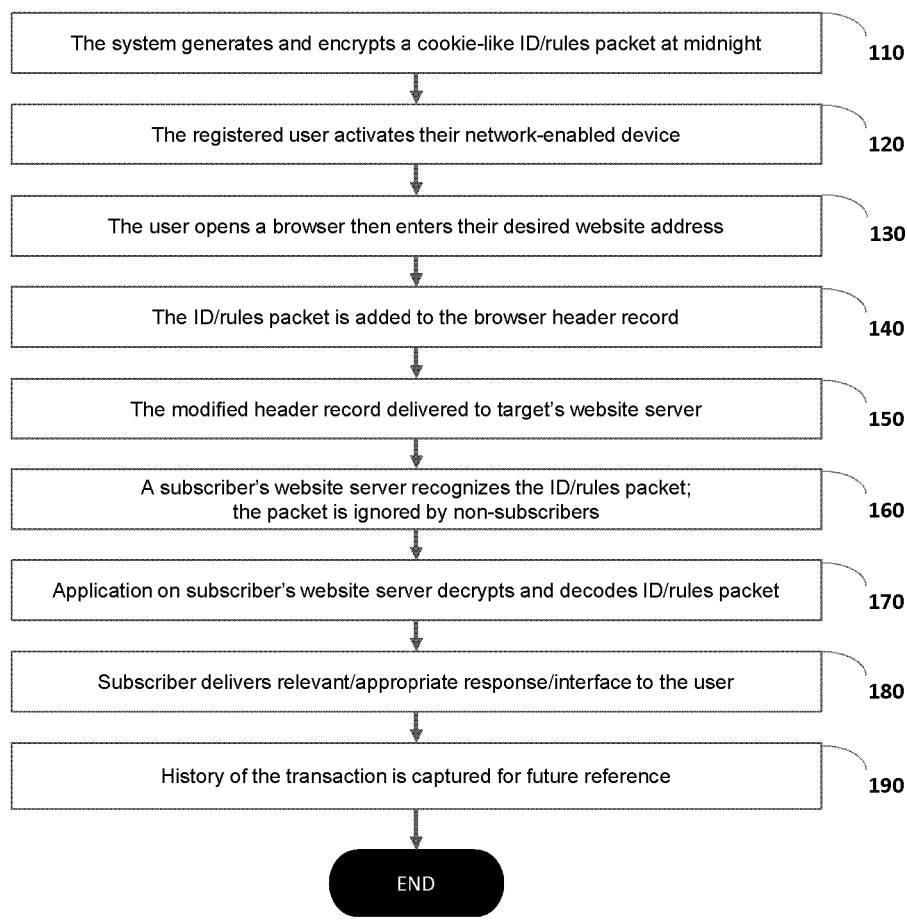
FIG. 1 is a block diagram illustrating at a high-level how a system-generated cookie-like packet of information is delivered to network-based resources, such as a web server, assisting resource provider efforts to determine a relevant response interface to a user's request.

Several figures have been presented to aid in understanding the present invention. The scope of the present invention is not limited to what is shown in the figures.

Reference Numeral Definitions are as Follows:
201a Browser header record exhibit
201b Browser header record—1st modification
201c Browser header record—2nd modification
202 Proxy authorization redirect packet syntax example
203 Cookie-like information packet syntax example
300 Registered personal network-enabled device
301 Embedded application software
302 Remote proxy authorization and address
303 Public web browser application
304 Standard browser header record
305 Semi-modified browser header record
306 Virtual private network (VPN) pathway
310 Remote server system configuration
311 Hybrid proxy server
312 Hybrid proxy server application software
313 Library of cookie-like information packets
313a Cookie-like information packet
314 Remote system's database server
315 Modified browser header record
315b Modified browser header record history record
316 Standard Internet connection—HTTP/HTTPS
320 Subscribing resource provider's web server
321 Embedded application software
322 Software application
323 Relevant response interface
323b Relevant response interface history record While particular embodiments have been written in the C# programming language, Linux Bash Unix command shell scripts, and TSQL database scripts, an experienced developer can easily utilize any programming language to leverage a browser header record as a type of reverse cookie transport mechanism. The present invention is not limited to a specific programming language. Any programming language may be used, and any combination of software and hardware may be used to achieve the functionality of the present invention.

References made within the accompanying drawings form a part of the description and illustrate generally, by way of example, but not by way of limitation, various embodiments discussed in the present invention. Table 1 provides a definitional list of terminology utilized herein for convenience only and is not to be taken as a limitation on the present invention.

Table 1—Term Definitions

"Resource consumer" or "resource provider" refers to individuals seeking, for use or consumption whether free of charge or for a fee, relevant resources including but not limited to information, imagery, products, services, tools or mobile applications made available via the Internet by resource providers.

"Resource provider" or "provider" includes but is not limited to public or private commercial, non-commercial, or non-profit organizations and government institutions that own/operate websites or other online resources, develop and maintain network-enabled device applications, or utilize, for example, Wi-Fi, 3G, 4G, RFID or other wireless communication protocols as well as mobile network-enabled smart device application distributors.

A "graphic user interface" (hereinafter, "GUI") refers to a visual method created by resource providers facilitating a resource consumer's ability to interact with electronic content accessible via a computer or other network-enabled device. Using this method content or resources are presented in an organized, intuitive, appealing, and easy-to-navigate manner, via a visual system of elements including imagery, icons, typography and navigation strategies including links and scrolling.

"Publicly owned" refers to devices or systems owned by local, state, or federal entities or agencies made available for public use.

A "subscribing resource provider" or "subscribing users" refers to individuals or public/private entities that support and utilize the tools and infrastructure made available via the present invention.

An "authorized individual" refers to a parent, guardian, custodian, executor or other caretaker responsible for the safety and well-being of a dependent, minor, protected individual or adult dependent.

The "world wide web" (hereinafter, "the web") is a system of interlinked resources accessible on the Internet.

The "Internet" is a global network of voluntary interconnected independent computer networks that use the Internet protocol suite, Transmission Control Protocol/Internet Protocol (TCP/IP), to link billions of devices worldwide.

A "browser header record" or "header record" is a packet of information containing the source address, (location of the device originating a user's request), and destination address (the network location of the resource requested by the user), facilitating a transfer of information across a network. Header records may include additional protocol-related information as required.

A "modified browser header record" is a packet of browser-generated information that has been modified by a consumer-controlled system or process, wherein said system or process: (a) generates an encoded and encrypted packet containing consumer-specific identity and related information use rules; and, (b) said packet is appended to the browser header record before release to the target destination.

"Online" refers to connected by computer to one or more other computers or networks, as through a commercial electronic information service or the Internet "Registered resource subscribers" or "registered subscribers" refers to individuals that complete the personal data and device registration process for themselves or other dependents in order to use the services of the present invention.

"Registered user" refers to minors, dependents, protected individuals and adult dependents that use the services of the present invention but do not complete the personal data and device registration process.

A "uniform resource locator" (hereinafter "URL") is an address reference to a resource accessible on the Internet via the Web.

A "consumer device" or "device" refers to a personal stationary or mobile computing instrument which facilitates connection to and use of resources available on a local or global network. Devices include but not limited to network-enabled personal desk or laptop computers, smart devices such as mobile phones or tablets, gaming systems, entertainment systems, wearables, or audio-activated personal assistants such as Amazon's Alexa or Google Home.

A "protected individual" refers to a person 18 years or older with impaired cognitive abilities limiting their capacity to make sound or reasonable judgements, that does not live with parents, guardians or other individuals responsible for a protected individual's emotional, financial, psychological or physical well-being.

A "smart device" refers to electronic technology generally connected to other devices or networks via various wireless communication protocols that can operate to some extent interactively and autonomously allowing individuals to connect, share and interact with other smart devices or network-based resources.

An "individual or visitor" refers to a consumer of resources available on the Internet via a web interface device.

A "designated contact" is a parent or guardian identified as the resource provider's point of contact for any registered user-related inquiries.

DESCRIPTION OF THE PREFERRED EMBODIMENTS

The following description of the preferred embodiments of the present invention is not intended to limit the preferred embodiment, but rather to enable any person skilled in the art to make and use this present invention.

Public and private sector resource providers operating network-based platforms continuously develop and evolve newer and more efficient methods, platforms, and networks to facilitate the acquisition, categorization, analyzation, communication, and distribution of information supporting their efforts to accurately identify and capture characteristics of visitors to their network-based resource. Their process may include the capture, storage, and analysis of a visitor's personal preferences and behaviors captured while a visitor is directly utilizing their resources as well as those captured and provided by third-party information tracking and sharing services. Both methods can be used as a means to achieve commercial and non-commercial goals. Other resource providers move toward a more collaborative relationship through the use of registration mechanisms which allow visitors to provide personal information. Though a step in the right direction, this method falls short in many ways, including: (a) visitors can provide false information to access the resources; (b) parents and guardians do not have complete visibility to all sites accessed by minors, protected individuals, or adult dependents; and (c), visitors must repeat the process, in various iterations, for a multitude of other resource providers requiring registration.

Unfortunately, the technical constraints of working within network-based platforms such as the Internet has led resource consumers looking for ways to protect their privacy to use a variety of solutions and strategies to build walls around themselves, their children, or other dependents. Though well intentioned, these walls can block access to important and relevant resources. Seeking to find a middle ground that establishes an environment wherein both resource consumers and resource providers can realize the advantages and influence derived from mutual respect, responsibility and reciprocity, the following embodiment of the reverse cookie method demonstrates a pathway for subscribing or registered users and subscribing resource providers to collaboratively build bridges facilitating the achievement of mutually beneficial goals and results.

From a high-level perspective, the following figures illustrate an example of a registered user's seeking to access the online resource of a registered resource provider via an Internet browser from their network-enabled device. Upon the receipt, recognition, and decoding of the mechanism described in this present invention the receiving system of a registered resource provider determines and releases the appropriate GUI initial response.

FIG. 1 is a flow diagram illustrating a high-level example of processes facilitated by the cookie-like information packet or reverse cookie method's functionality. In this particular embodiment, the process starts at midnight each day, or other time, when the system generates and stores an encoded and encrypted cookie-like information packet 110 for potential use during the subsequent 24-hour period which ends at 11:59 p.m. each day. This cookie-like information packet contains a set of personal identity characteristics and corresponding data collection and use rules. To provide better clarity into the process, consider an example wherein the registered user is a 12-year-old minor wanting to visit a website. When the minor turns on their registered network-enabled device 120, and an embedded application is activated. Subsequently, each time the minor enters the network address of a desired destination into a public browser 130, the cookie-like information packet is retrieved then added to the last line of the browser-generated header record 140. The modified browser header record is then released and delivered to the target web server 150. A subscribing resource provider's web server will recognize the cookie-like information packet embedded within the header record, which is ignored by non-subscriber web servers 160. Upon recognition, the cookie-like information packet is decrypted and decoded 170. The revealed information is then analyzed by the subscriber's system determining an appropriate user interface 180 to be returned to the minor. Upon receipt of the relevant user interface 180 the minor determines how or if he/she wishes to continue to engage with the subscriber's website interface. Finally, a record of the GUI and other interactions sent from the subscriber's system to the minor's registered network-enabled device is captured and saved for future reference 190.

FIG. 2a is an example of a browser header record's syntax 201a resulting from a subscribing or registered user's utilization of a public browser to access Facebook's social media website. By typing Facebook's web address into the appropriate data entry box within the browser, a header record 201a is systematically generated.

Next, before the browser header record is released from the subscribing or registered user's registered network-enabled device, FIG. 2b illustrates the addition of a proxy authorization address 202 to the last line of the header record 201b. The proxy authorization address 202 is added for the purpose of changing the browser header record's routing path to a hybrid proxy server to facilitate the final phase of the header record modification process described in this embodiment of the present invention.

FIG. 2c illustrates the addition of the cookie-like information packet 203 to the last line of browser header record's 201c format. In this example, the label "x-wwpcm-data:" precedes the cookie-like information packet in compliance with the established standards of browser header record structure.

Figure 3:
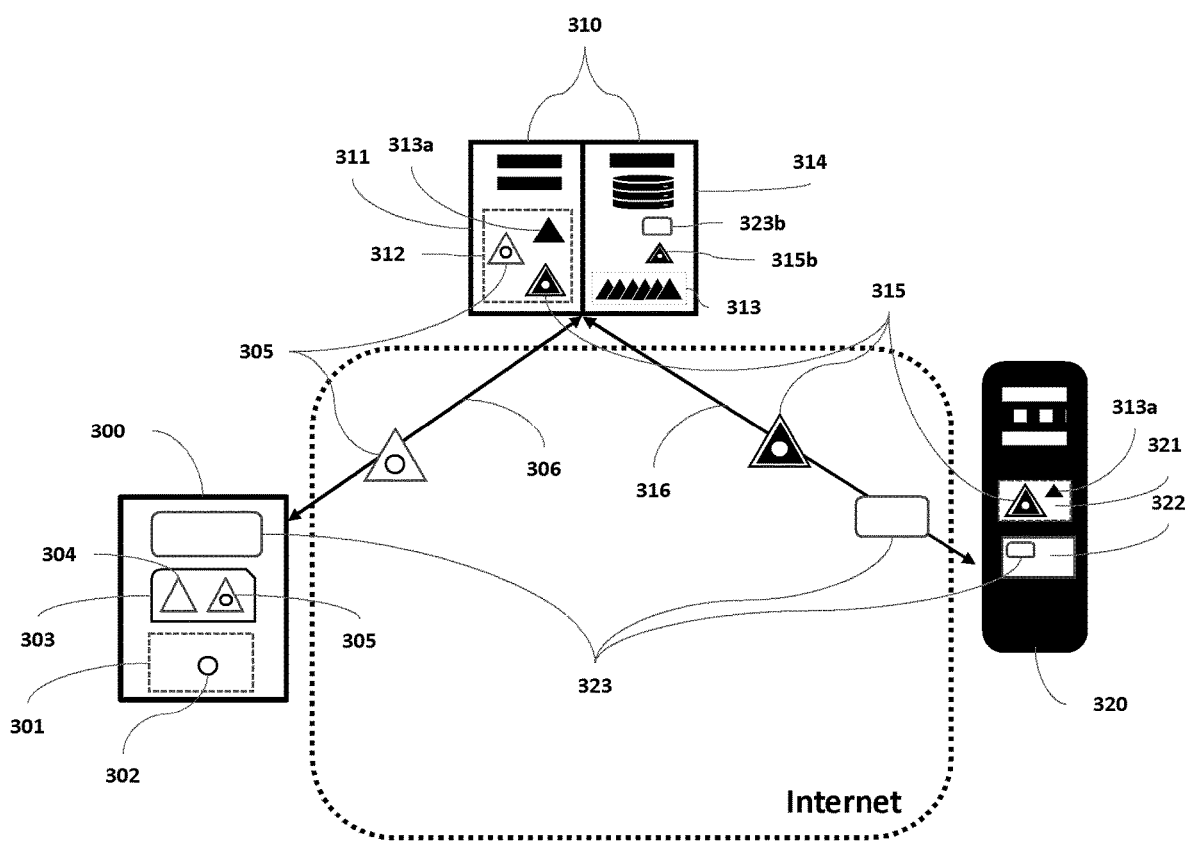
FIG. 3 is an illustrative example of the interaction between registered resource seekers and subscribing resource providers utilizing three interconnected platforms to facilitate information packet creation, browser header record modification, modified browser header record delivery to the target resource provider, and the return of a relevant response based on information revealed in the cookie-like information packet.

FIG. 3 illustrates a detailed description of the reverse cookie method demonstrating a typical hardware configuration may include: a) a subscribing or registered user's personal network-enabled device 300, b) a remote server system 310, and, c) a subscriber's web server system 320, as well as corresponding software applications 301, 312, and 321 facilitating the functionality of the reverse cookie method.

In this embodiment, at 12:00 a.m. daily, a library of cookie-like information packets 313 for each subscribing or subscribing or registered users is created, encrypted, and stored within the remote server system 310 making all packets immediately available. When a registered subscriber or user turns on their network-enabled device 300, embedded application software 301 activates, enabling the network-enabled device to utilize the functionality of the reverse cookie method of the present invention each time the registered subscriber or user engages a web browser interface 303 to navigate directly or indirectly, via search functionality, to access network-based resources on the Internet via the web. If, for example, a subscribing or registered user enters the URL address of a subscribing resource provider's web server 320, then hits the Enter key on their registered personal network-enabled device 300, this series of actions cause the public web browser application 303 to generate a standard header record 304. Simultaneously, a series of sub-routines within a software application 301 embedded on the subscribing or registered user's personal network-enabled device 300: (a) generates a string of text for remote proxy authorization 302; (b) adds the remote proxy authorization 302 to the last line of the browser header record 304 creating a semi-modified browser header record 305; (c) establishes a VPN pathway 306; and, (d) releases the semi-modified browser header record 305 from the subscribing or registered user's personal network-enabled device 300 through the VPN channel 306 to a hybrid proxy server 311 within a remote server system configuration 310. Upon the hybrid proxy server's 311 receipt of the semi-modified browser header record 305, a sub-routine within the hybrid proxy server's application software 312 retrieves the subscribing or registered user's corresponding cookie-like information packet 313a from a library of cookie-like information packets 313 stored on the remote system's database server 314 The requested cookie-like information packet 313a is then added to the semi-modified browser header record 305 completing the browser header record modification process. The modified browser header record 315 is released from the hybrid proxy server 311 via a standard HTTP/HTTPS internet connection 316 to the target resource provider's web server 320. Simultaneously, a copy of the modified browser header record 315b is stored on the remote system's database server 314 for historical purposes. Upon receipt by the subscribing resource provider's web server 320, the modified browser header record 315 is intercepted by embedded application software 321 housed on the subscribing resource provider's web server 320 wherein the cookie-like information packet 313a is isolated for decryption and decoding. Once decoded and decrypted, the revealed personal identity and rules information is analyzed by a separate subscribing resource provider-developed software application 322, systematically determining the appropriate response to return to the subscribing or registered user's network-enabled device 300. Once a relevant user interface response 323 is selected, it is returned to the subscribing or registered user's personal network-enabled device 300 via standard HTTP/HTTPS Internet protocols 316 to the remote server system configuration 310, wherein a copy of the relevant user interface response 323b is captured and stored before it is released via the VPN pathway 306 to the subscribing or registered user's personal network-enabled device 300 for user interaction. A record of all subsequent traffic between the user's personal network-enabled device 300 and the subscribing resource provider's web servers 320 during a session may be captured and stored in the remote system's database server 314 for historical purposes including future reference or use.

Figure 4:
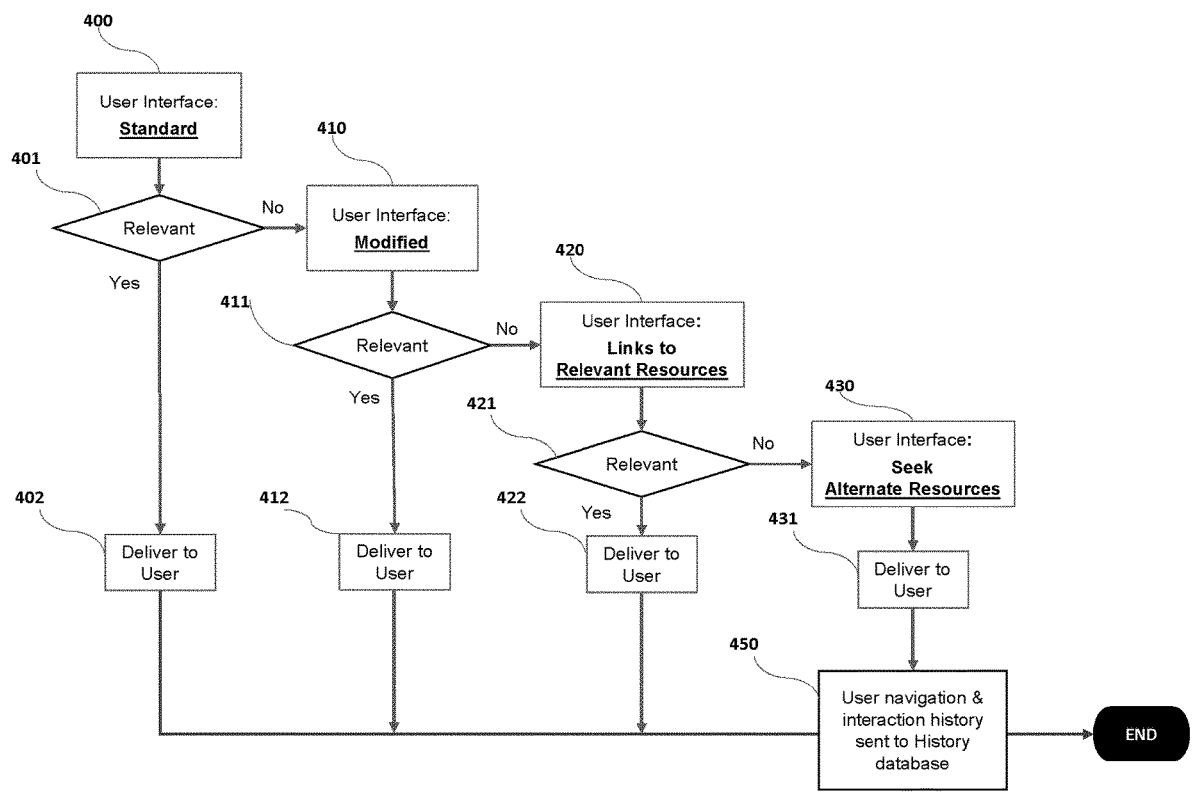
FIG. 4 is flow diagram illustrating a resource provider's decision tree for determining the appropriate response to return to a registered resource seeker's network-enabled device.

FIG. 4 illustrates a standardized hierarchical decision tree for use by subscribing resource providers of the reverse cookie method to assist and simplify their efforts to determine the appropriate response to return to a subscribing or registered user. In this embodiment there are 4 types of user interface responses—standard 400, modified 410, links to relevant providers 420, and seek alternate providers 430. The standard response 400 is delivered to subscribing or registered users meeting the defined criteria. This response may be delivered to all non-registered visitors. The modified response 410 is utilized when a subscribing resource provider's content, tools, services, or messaging are only partially appropriate based on the profile of the subscribing or registered user. If, however, the subscribing resource provider does not have content or resources appropriate to the subscribing or registered user's profile, but in the spirit of customer service seeks to build a bridge to a future relationship, the resource provider delivers a relevant response 420 containing a selection of links to appropriate third-party alternatives. When the subscribing resource provider chooses to deny access to their website or does not have visibility to appropriate relevant alternatives, the final response type 430, directing the subscribing or registered user to seek alternate resources, is delivered to the device of subscribing or registered users.

The following examples are intended to clarify the use and importance of the standardized hierarchical decision map illustrated in FIG. 4. Assume that a resource provider's Terms of Use policy states that users must be 18 years of age or older and is designed specifically for male visitors. The decoded cookie-like information packet reveals that the subscribing or registered user is an 18-year-old male. In this instance the standard 400 user response interface is determined as relevant 401 triggering its release 402. In the next example the same resource provider receives a packet revealing the subscribing or registered user to be a 17-year-old male. For this visitor the relevance test 411 indicates that a modified 412 user response interface should be released giving the resource provider the ability to deliver a pre-defined response that will engage the 17-year-old creating a user experience that will bridge the relationship until he reaches his 18$^{th}$ birthday. The next visitor to this website is revealed as a 17-year-old female. The relevancy test 421 triggers the release 422 of a alternate 420 response containing links to relevant websites making it easy for the visitor to access resources aligning with her needs. Additionally, this response allows the resource provider to gain the good will of the registered female user who may in turn share the experience with her male friends positively impacting its brand equity. In our last example, the visitor is a 13-year-old registered male. The relevancy test 421 triggers the release of the not applicable 430 user response advising the 13-year-old that he does not meet the age level defined in its Terms of Use policy, directing the visitor to continue his search for appropriate resources. In all stated examples, upon release of the appropriate user response, (standard 400, modified 410, relevant 420 or seek alternates 430), the response can be captured and saved in the remote system's database server 450 for historical purposes including future reference or use. It should be noted that all examples given are intended to aid in understanding the present invention. The scope of the present invention is not limited to any example or group of examples.

Figure 5:
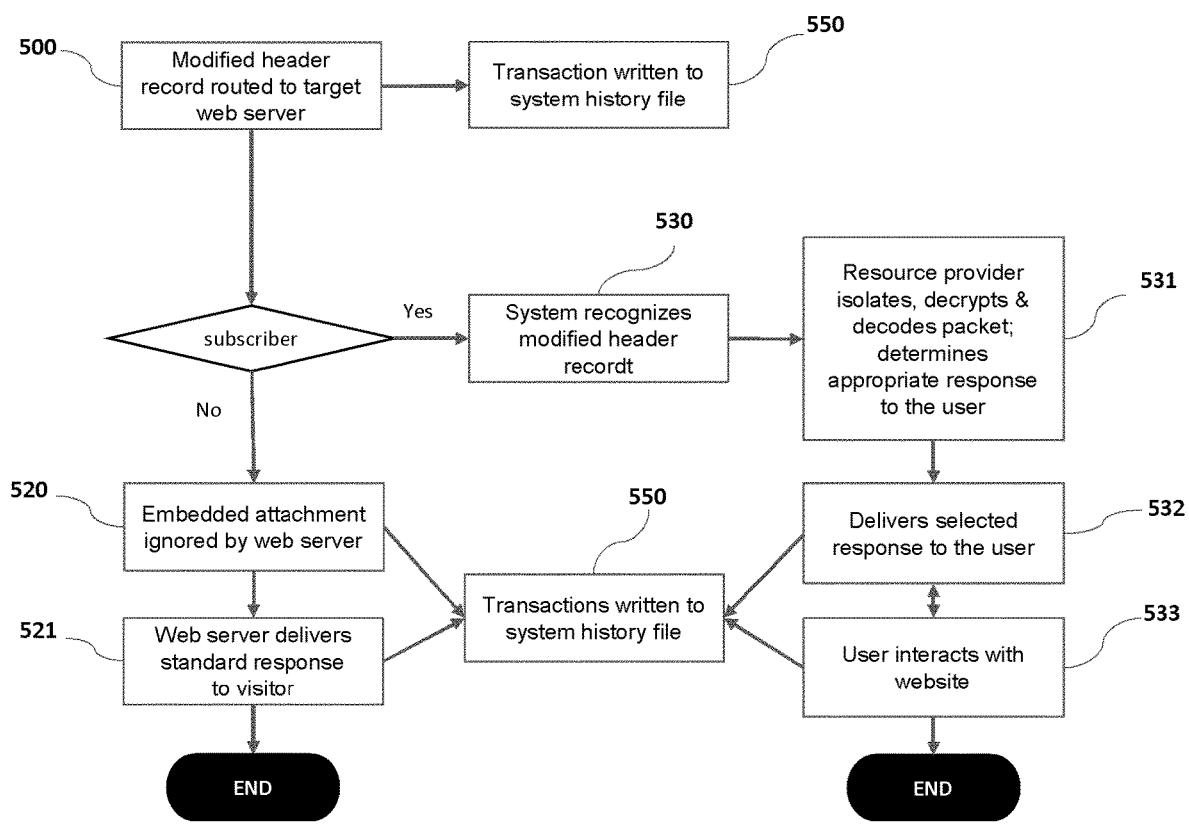
FIG. 5 is a flow diagram illustrative of how web servers react to the receipt of modified browser header records.

FIG. 5 demonstrates, in block diagram format, the impact of the modified browser header record when received by participating and non-participating resource providers. When the modified browser header record 500 is released, a copy is simultaneously saved to the remote system's database server 550 for historical purposes. If the modified browser header record 500 is recognized 530 by a subscribing resource provider's system, an application 531 isolates, decodes, decrypts, and analyzes the contents of the cookie-like information packet to determine the appropriate response. The appropriate response is delivered to the subscribing or registered user's device 532, allowing the subscribing or registered user to interact with the resource provider's content and/or tools 533 accordingly. If, however, the modified browser header record 500 is not recognized, the embedded information packet is ignored 520 and the resource provider delivers to the subscribing or registered user their standard response 521. In both scenarios, all transactions and navigation activity can be saved to the remote system's database server 550 for historical purposes and future access by authorized individuals.

FIG. 6 contains tables which in a particular embodiment of the present invention defines identity characteristics as well as information tracking and use parameters which may be contained within the cookie-like information packet based on variables selected during the registration process. The example includes two types of identity characteristics 610 captured during the registration process—mandatory and optional. The mandatory list may include examples of the minimum amount of identity characteristics necessary to allow subscribing resource providers the ability to determine the appropriate user response, for example: gender, gender identity-how the individual identifies themselves (typically name or some other personal identifier), birth date, and whether the individual has intellectual limitations or lack sound decision-making skills. Optional characteristics may include ethnicity, race, religious affiliation, sexual orientation, and region or country where the subscribing or registered user of the system resides. Additionally, information tracking and use parameters 620 sent to subscribing resource providers may further define the parameters of the relationship. In one embodiment, rules may provide parents or guardians the ability to define the boundaries from a tracking, data use, engagement, and purchase authority perspective. For example, the parent or guardian of a 12-year-old female uses rules functionality to notify subscribing resource providers that their daughter's user preferences and behaviors may be tracked, however preference and behaviors information may not be shared with or sold to third parties. The flexibility of the breadth and depth of data authorized to be shared combined with rules functionality allows subscribers to navigate and respond to the demands of a constantly evolving network-based environments such as the internet.

In an alternative embodiment, while still utilizing the capabilities of the reverse cookie method's three inter-related platforms, (a registered network-enabled device, a remote server system, and privately or publicly owned/operated registered resource servers, such as a web server), there are a multitude of ways to configure and utilize this triad of platforms to facilitate the solutions provided by this method; solutions which include but are not limited to: (a) the daily or other periodic creation of a cookie-like information packet which when decrypted and decoded reveal personal identity characteristics as well as corresponding data collection and data use rules; (b) the use of a browser header record to deliver the cookie-like information packet to network-based resource providers; (c) the isolation, decryption, and decoding of cookie-like information packets; and (d), the capture of responses sent to the user for historical reporting and other purposes.

Additional embodiments can include but are not limited to: (a) multiple cookie-like information packets can be created for each registered user containing URL-specific personal identity characteristics and corresponding rules; (b) the cookie-like information packet can be generated each time a browser search is initiated; (c) the cookie-like information packet can be generated each time a profile is updated; (d) the cookie-like information packet may be created on the user's registered network-enabled device and attached to the browser header record by software integrated within the computer/network-enabled device, mobile applications, browser plug-ins, or a combination of these elements; (e) the cookie-like information packet can be stored in RAM; (f) the cookie-like information packet can contain other types of data, rules, etc.; (g) the cookie-like information packet can contain a specific code directing the resource provider to contact them for additional rules or personal identity information specific to the relationship the registered user wishes to establish with the resource provider; (h) multiple cookie-like information packets may be added to a browser header record; (i) the proxy server may be localized on the user's computer/network-enabled device; (j) a remote server may be utilized in place of a remote proxy server; (k)

public or private browser channels may be utilized as the pathway to deliver modified browser header records to a network-based resource, such as a web server; and, (1) historical transaction records containing responses delivered to the user from a resource provider's web server, may be captured then delivered in batch to the remote server system facilitating the functionality of the reverse cookie method; the selection of the appropriate embodiment decision potentially based on speed or economic factors.

Although specific embodiments have been illustrated and described herein, it should be appreciated that any arrangement calculated to achieve the same purpose may be substituted for the specific embodiments shown. And, though written in particular programming languages, the use of browser header records as a mechanism for the delivery personal information packets does not limit the utility of the present invention be written in a specific software language.

This disclosure covers any and all adaptations or variations of various embodiments. Combinations of the above embodiments, and other embodiments not specifically described herein, will be apparent to those of skill in the art upon reviewing the above description.

The following is a summary of the present invention

A system that allows users of network-enabled devices such as personal desk/laptop computers, smart phones, or tablets to generate, maintain, and deliver to network-based resource providers, a cookie-like information packet encapsulating an encoded combination of relevant personal identity characteristics and corresponding rules, wherein rules allow users to define the boundaries related to supplemental data collection, the parameters relating to how provided or collected data can be used, pathways for additional contact and/or permissions, and, the extent information can be shared internally or externally with third-parties. The system generates and stores a user ID for each registered user and an associated rule set for the user ID detailing how the user ID information may be used and distributed to third parties. The user may update the ID and rule set at any time. The system generates and encrypts a cookie-like information packet for each stored user ID and rule set typically at a fixed time every day with midnight being the preferred fixed time.

The method wherein a registered resource provider's network-based systems is able to recognize, isolate, decrypt and decode a cookie-like information packet attached to the browser header record;

The method wherein the network-enabled device owner and the device are registered to use the system, wherein as a function of the registration process personal identity information, information collection rules, and data use rules are defined;

The method wherein the owner of a network-enabled device registers users, wherein as a function of the registration process user-specific personal identity information, information collection rules, and data use rules for the subscribing or registered users are defined;

The method wherein the owner of a network-enabled device registers users, wherein as a function of the registration process user-specific personal identity information, information collection rules, and data use rules for the subscribing or registered users are defined;

Instructions wherein registered user types may include:
a) minors
b) dependents
c) protected individuals
d) adult dependents
Instructions wherein personal identity information includes, but are not limited to:
a) user type
b) birth month
c) birth year
d) gender
Instructions wherein subscribing or registered user information collection rules may include:
a) online behaviors or transactions
b) online preferences
c) navigation history
The instructions wherein said rules, define:
a) how and under what circumstances the provided identity information can be used;
b) how and under what circumstances supplemental subscribing or registered user information can be directly captured or used by the resource provider;
c) how and under what circumstances subscribing or registered user-related information obtained from third parties can be retained or used by the resource provider;
d) how and under what circumstances a designated contact can be contacted for additional information or permissions; and
e) how and under what circumstances the resource provider can share information with third parties regardless whether said information was provided to, captured by, or obtained from other sources.

A method for configuring a registered network-enabled device to support the methods, systems and processes of the present invention, comprising:
a) downloading the network-enabled device-compatible configuration software from a website or mobile app store;
b) registering the network-enabled device and linking said device to the corresponding registration and rules data records;
c) configuring establishing a pathway for routing user-defined traffic to resource provider system servers.

The method wherein when activated, the registered network-enabled device, initiates the process to create and attached the cookie-like packet of encoded and encrypted data to a browser header record, and routed to target online resource;

The instructions wherein the present invention is activated when a subscribing or registered user attempts to access a resource provider via the network-enabled device by:
a) entering key words into a browser search engine, clicking on the most appropriate link; or
b) entering the address of the resource provider they want to access into a browser; or
c) clicking on a mobile device application icon; or
d) clicking on a URL link embedded within a resource provider's website redirecting the subscribing or registered user to another resource provider's website; or
e) clicking on a text or image link embedded within an electronic communication, such as an email or social media posting; or
f) clicking on a display ad's text or image link redirecting the subscribing or registered user to the selected resource provider's online resource.

The instructions wherein when the information packet is created, the instructions comprising:
a) retrieving information in real-time from identity and related rules databases;
b) combining the information into a single string of consolidated and encoded data;
c) encrypting the string; and
d) storing the generated info packet each day until 11:59:59 pm for use during each 24-hour period.

The instructions wherein the completed info packet is appended to the browser header record, creating a modified header record.

The instructions wherein the modified browser header record is delivered to the target resource provider's URL.

The instructions wherein the modified browser header record's route to the target online resource, may include:
  a) Direct routing from the commercially or publicly owned device; or
  b) Routed first through a virtual private network system for processing then released directly to the target resource for recognition, decryption, decoding, analysis, and response generation.

A system that allows registered commercially or publicly owned network-enabled devices such as personal desk/laptop computers, smart phones, or tablets to generate, maintain, and deliver to network-based resource providers, a cookie-like information packet encapsulating an encoded combination of relevant information including identification of the device as commercially or publicly owned, the parameters relating to how provided or collected data can be used, pathways for additional contact and/or permissions, and, the extent information can be shared internally or externally with third-parties.

The method wherein a registered resource provider's network-based systems is able to recognize, isolate, decrypt and decode the cookie-like information packet attached to a browser header record;

The method wherein network-enabled commercially or publicly owned devices and subscribing or registered users are registered to use the system, wherein as a function of the registration process, the type or description of the commercial or publicly owned or sponsored entity, general user profiles, information collection rules, and data use rules are defined.

Instructions wherein entities may include:
  a) businesses
  b) non-profit organizations
  c) schools
  d) libraries
  e) community centers
  f) local, state or federal offices
  g) religious centers Instructions wherein general user profiles may consist of, but not limited to:
  a) commercial employees
  b) government employees
  c) non-profit employees
  d) student's/individual's age
  e) students/individual's grade range
  f) student's/individual's gender
  g) student's/individual's race
  h) student's/individual's religious affiliation The method wherein when activated, the registered network-enabled device, initiates the process to create a cookie-like packet of encoded and encrypted data reflecting a combination of:
  a) notification that the user does not own the device
  b) entity type
  c) general user profile
  d) information collection rules
  e) and data usage rules as related to subscribing or registered user's identity, preferences, or behaviors stored in the user's profile registration database;

The instructions wherein said rules:
  a) define how and under what circumstances provided information can be used by the resource provider;
  b) define how and under what circumstances supplemental resource user information can be directly captured and used by the resource provider;
  c) how and under what circumstances resource user-related information obtained from a third party for the resource provider can be used;
  d) define how and under what circumstances the subscriber can be contacted for additional information or permissions; and
  e) defining under what circumstances the resource provider can share user-related information with third parties regardless whether said information was provided, captured, or obtained from other sources.

A method for configuring a registered network-enabled device to support the methods, systems and processes of the present invention, comprising:
  a) downloading the network-enabled device-compatible configuration software from a website or mobile app store;
  b) registering the network-enabled device and linking said device to the corresponding registration and rules data records;
  c) configuring establishing a pathway for routing user-defined traffic to resource provider system servers.

The method wherein when activated, the registered network-enabled device, initiates the process to create and attached the cookie-like packet of encoded and encrypted data to a browser header record, and routed to target online resource;

The instructions wherein the present invention is activated when the user of a commercially or publicly owned registered device attempts to access a resource provider via the network-enabled device by:
  a) entering key words into a browser search engine, clicking on the most appropriate link; or
  b) entering the address of the resource provider they want to access into a browser; or
  c) clicking on a mobile device application icon; or
  d) clicking on a URL link embedded within a resource provider's website redirecting the subscribing or registered user to another resource provider's website; or
  e) clicking on a text or image link embedded within an electronic communication, such as an email or social media posting; or
  f) clicking on a display ad's text or image link redirecting the subscribing or registered user to the selected resource provider's online resource.

The instructions wherein when the information packet is created, the instructions comprising:
  a) retrieving information in real-time from identity and related rules databases;
  b) combining the information into a single string of consolidated and encoded data;
  c) encrypting the string; and
  d) storing the generated info packet each day until 11:59:59 p.m. for use during each 24-hour period.

The instructions wherein the completed info packet is appended to the browser header record, creating a modified header record.

The instructions wherein the modified browser header record is delivered to the target resource provider's URL.

The instructions wherein the modified browser header record's route to the target online resource, may include:
  a) Direct routing from the commercially or publicly owned device; or
  b) Routed first through a virtual private network system for processing then released directly to the target resource for recognition, decryption, decoding, analysis, and response generation.

A method and system delivering computer-readable instructions to registered resource providers, that when executed activates instructions for revealing the registered resource requestor's identity and corresponding information-use rules in order to determine the appropriate response interface to deliver to the visiting resource requestor, the instructions comprising:
a) recognition of the modified browser header record; and
b) isolation, decryption, decoding of the information packet appended to the modified browser header record.

The instructions wherein the information packet is analyzed to reveal the personal or general identity metrics of the visiting resource requestor based on the personal or device registration profile.

The instructions wherein the resource provider determines the appropriate interface to be delivered to the visiting resource requestor based on revealed information.

The instructions wherein the appropriate interface may, but is not limited to include:
a) The resource provider's standard consumer interface which will allow the individual to access all provider resources; or
b) The resource provider's modified consumer interface which will allow the individual to access appropriate resources from the provider's online resources; or
c) The resource provider's modified consumer interface which will include a link or multiple links to visitor-appropriate resources available from third-party resource providers; or
d) Resource provider delivery of a modified consumer interface notifying the visitor that its online resources are not appropriate or relevant to the consumer requiring the consumer to enter the URL in their browser or click on a mobile app link to navigate to an alternate online destination.

The method, wherein use rules define the type and extent of information that the resource provider can capture, retain on file, or share with a third party, the instructions comprising:
a) determining what, if any, identity information can be retained by the resource provider;
b) determining if the registered user can be contacted directly by the resource provider in response to the registered user's inquiries or perceived interest;
c) determining the identity of the designated contact to receive communications in the event the registered user is a minor, protected individual, or adult dependent;
d) determining communication pathways to reach the resource requestor or the designated contact;
e) determining if resource requestor-related information, obtained through third-party sources, can be used by the resource provider for commercial or non-commercial purposes; and
f) determining what, if any resource requestor-related information can be shared with third parties.

A method for providing a pathway for authorized individuals to deactivate the present invention on the registered network-enabled device utilized by registered users.

The instructions wherein the deactivation process of the present invention on a network-enabled device comprises:
a) request originates from the authorized individual's network-enabled device; and
b) confirms authorized individual identity through multi factor authentication.

A method for capturing and storing resource provider interactions with resource requestors for historical and legal reporting purposes.

A method for resource providers to communicate with designated contacts through the system, allowing the system to capture the details of the communication, comprising notification of:
a) repeated requests by registered users to access resource provider resources that do not align with rules;
b) repeated requests by registered users to purchase products or services previously declined by resource provider.

A method providing a pathway for resource providers to submit inquiries to designated contacts to request the approval status for registered users to access to resources that are not defined within the access rules documented within their profile.

A method for identifying and communicating with potential resource providers to solicit participation in the service of the present invention based on resource requestor online activities, including but not limited to:
a) capturing all website or other online resource visits or inquiries;
b) capture of all visits to app stores or social platforms; or
c) o analysis of online traffic.

Several descriptions and illustrations have been provided to aid in understanding the present invention. One with skill in the art will realize that numerous changes and variations are possible without departing from the spirit of the invention. Each of these changes and variations is within the scope of the present invention.

We claim:

1. A system for controlling distribution and use of personal identity characteristics over a network comprising:
a system computer with storage coupled to a network, said storage containing at least one user identification record with an associated rule set governing use of information in said user identification record, the information in the user identification record and rule set being supplied by a registered user;
the system computer configured to generate, encrypt and store a cookie-like information packet for the at least one user identification and associated rule set;
the system computer also configured to transmit the cookie-like information packet over the network periodically or on demand;
an embedded user application loadable and executable by a registered user on a network-enabled device, the embedded user application configured to cause the cookie-like information packet to be added to a transmitted record when the registered user accesses a network-based resource over the network; and
a subscriber application loadable and executable by a subscribing internet-based resource, the subscriber application configured to decrypt and decode the cookie-like information packet in the transmitted record, accessing the user identification and the associated rule set; wherein, the subscribing network-based resource delivers an appropriate response to the registered user based on the associated rule set.

2. The system of claim 1 wherein the transmitted record is a browser header record, and the embedded user application is configured to send the browser header record to a proxy server for addition of the cookie-like information packet to the browser header record producing a modified browser header record, and the proxy server is configured to forward the modified browser header record to the subscribing network-based resource.

3. The system of claim 2 wherein proxy server is a system server.

4. The system of claim 2 wherein the proxy server is located on the network enabled device.

5. The system of claim 2 wherein the user application is configured to add a remote proxy authorization to the browser header record.

6. The system of claim 2 wherein the embedded user application is configured to establish a virtual private network (VPN) pathway with the proxy server to send the browser header record to the proxy server.

7. The system of claim 2 wherein the modified browser header record is forwarded to the subscribing network-based resource.

8. The system of claim 2 wherein a copy of the modified browser header record is stored in system servers as a historical record.

9. The system of claim 2 wherein the modified browser header record is constructed so that the cookie-like information packet is ignored by non-subscribing network-based resources.

10. The system of claim 1 wherein the system computer is configured to transmit the cookie-like information packet over the network at a particular time each day.

11. The system of claim 10 wherein the particular time each day is midnight.

12. The system of claim 1 wherein the system computer generates and encrypts a library of cookie-like information packets for each registered user at the particular time each day.

13. The system of claim 12 wherein the library of cookie-like information packets for each registered user contains a cookie-like information packet each network-based resource the registered user desires to control personal identity characteristics to.

14. The system of claim 1 wherein the network-based resource is a website.

15. The system of claim 1 wherein the subscribing network-based resource uses a hierarchical decision tree to deliver the appropriate response.

16. The system of claim 1 wherein the user identification record contains at least gender and birth date.

17. The system of claim 16 wherein the user identification record contains intellectual limitations.

18. A method for controlling distribution and use of personal identity characteristics over a network comprising:
causing an encrypted cookie-like information packet containing user identification information and an associated rule set governing the use and distribution of said user identification information to be generated;
causing the encrypted cookie-like information packet to be added to a transmission record when a registered user attempts to access a particular network-based resource;
causing the cookie-like information packet to be decrypted by a subscribing network-based resource to access the user identification information and the associated rule set;
causing the subscribing network-based resource to provide responses governed by the identification information and the associated rule set.

19. The method of claim 18 wherein libraries of encrypted cookie-like information packets are updated each day.

20. The method of claim 18 wherein the encrypted cookie-like information packet is added to the transmission record by a proxy server.

21. The method of claim 18 wherein a copy of the transmission record containing the encrypted cookie-like information packet is stored in a database as a historical record.

22. A system for controlling access and distribution of personal identification information comprising:
a proxy server; and
a database, wherein the database is accessible by the proxy server; the database including a plurality of user identification records for registered users, each user identification record containing personal identification information for a registered user and a rule set governing at least one of 1) what personal identification information may be accessed, 2) how the personal information may be used, 3) and to whom the personal identification information may be distributed;
wherein, the proxy server is configured to add a cookie-like information packet containing the personal identification information and rule set to a transmission record when a registered user attempts to access any network-based resource creating a modified browser header record, and configured to then forward the modified transmission record to the internet-based resource.

23. The system of claim 22 wherein the rule set is specific to a particular network-based resource.

24. The system of claim 23 wherein the particular network-based resource is configured to recognize and decode the cookie-like information packet and provide a response to the user based on the rule set contained in the modified transmission record.

* * * * *